United States Patent [19]
Joseph et al.

[11] Patent Number: 5,761,415
[45] Date of Patent: Jun. 2, 1998

[54] MAINTAINING DISTRIBUTION LISTS IN A NAMING SERVICE WITH INFORMATION FOR ROUTING MESSAGES TO USERS IN A NETWORK AND TO REMOTE USERS

[75] Inventors: Brett Joseph, Northboro; Kathleen McConnell, Groton, both of Mass.

[73] Assignee: Banyan Systems, Inc., Westboro, Mass.

[21] Appl. No.: 573,115

[22] Filed: Dec. 15, 1995

[51] Int. Cl.⁶ .................................................. G06F 13/00
[52] U.S. Cl. .................. 395/200.3; 395/200.34; 395/200.36; 379/93.24
[58] Field of Search ............... 395/200.01, 200.18, 395/200.3, 200.34, 200.36; 379/58, 93.24; 370/407

[56] References Cited

U.S. PATENT DOCUMENTS

| | | | |
|---|---|---|---|
| 5,329,619 | 7/1994 | Pagé et al. | 395/200.01 |
| 5,406,557 | 4/1995 | Baudoin | 370/407 |
| 5,479,472 | 12/1995 | Campana, Jr. et al. | 379/58 |
| 5,535,375 | 7/1996 | Eshel et al. | 395/500 |
| 5,560,005 | 9/1996 | Hoover et al. | 395/600 |
| 5,577,202 | 11/1996 | Padgett | 395/200.18 |
| 5,625,675 | 4/1997 | Katsumaru et al. | 379/67 |

OTHER PUBLICATIONS

Banyan Systems Incorporated, "Managing VINES Users and StreetTalk," Table of Contents, Chapters 1, 6, and 14, Order Number: 001556, Dec. 1992.

Banyan Systems Incorporated, "Planning a VINES Network," Table of Contents, Chapters 3 and 8, Order Number: 001907, Dec. 1992.

Lamb et al., "LAN-Based Office for the Enterprise, A Case Study," 19th Conference on Local Computer Networks, IEEE, Oct. 1994, pp. 440–447.

Znati et al., "A Simulation Based Analysis of Naming Schemes for Distributed Systems", 25th Annual Simulation Symposium, IEEE, Apr. 1992, pp. 42–51.

*Primary Examiner*—Alyssa H. Bowler
*Assistant Examiner*—Walter D. Davis, Jr.
*Attorney, Agent, or Firm*—Hale and Dorr LLP

[57] ABSTRACT

A naming service maintains lists of names for receiving messages, with the names having a defined format portion for routing messages in the network. At least some names have additional routing information that is passed to another server or service for routing the messages externally, such as with remote e-mail or facsimile transmission.

20 Claims, 3 Drawing Sheets

MAINTAINING DISTRIBUTION LISTS IN A NAMING SERVICE WITH INFORMATION FOR ROUTING MESSAGES TO USERS IN A NETWORK AND TO REMOTE USERS

FIELD OF THE INVENTION

This invention relates to networks, to maintaining distribution lists in a naming service, and to methods for making and using such distribution lists.

BACKGROUND OF THE INVENTION

Organizations from small firms to large international corporations use computer networks to interconnect workstations, servers, and host computers. In typical networks, servers are computers that connect the workstations to host computers and provide services, such as print, file, security, messaging, naming, and directory assistance. Each of these services includes hardware for processing and storing data under control of appropriate software. Each server can have a number of different services.

Referring to FIG. 1, an exemplary network with generally known types of interconnections has servers 10, 12, and 14 connected to groups of workstations 16, 18, and 20 and to host computers 22, 24, and 26. Each workstation preferably includes at least a CPU, a display such as a CRT or LCD, and one or more input devices such as a keyboard and a mouse.

A first LAN 28 for connecting a server and workstations is of the Ethernet-type, while a second LAN 30 and a third LAN 32 are each token rings. First server 10 and second server 12 are connected to each other over a switched line 34, while the second server 12 and third server 14 are connected over a backbone LAN 36. The servers can be directly connected to the host computers, or can be connected over switched networks. These different types of interconnections have various benefits and drawbacks, so they are chosen by network managers in response to the particular needs of the organization.

Such networks are run according to network operating system (NOS) software, an example of which is VINES® NOS software available from Banyan Systems Inc. (VINES is a registered trademark of Banyan). The NOS software resides on the servers and typically on the workstations. In an exemplary server 14, NOS software is stored on server disks 42, which also typically store other information, such as application programs and data files. One or more cartridge tape drives 44 allow the network manager to install the NOS software and to provide high-speed backup of information on server disks 42. The server is run by a central processing unit (CPU) 46 that has memory that can be expanded with additional memory cards 48.

To make connections to other devices, the server has communications cards 50 including LAN cards for connecting workstations to servers, and servers to one another; it also has serial cards for connecting servers to other servers or to mainframes or minicomputers, either directly or through modems and phone lines. The serial cards can also be used for connection to printers 52, or the printer can be connected to a parallel printer port.

The CPU controls a number of services that are provided with the NOS software, including a global naming service (GNS) such as a StreetTalk™ naming service (StreetTalk is a trademark of Banyan Systems Inc.). Network administrators use the naming services to create and maintain databases of names and information about various resources. To keep track of names of users and resources, the GNS is distributed among the servers, which regularly share information to indicate changes to the other naming services. The distributed naming service thus maintains a complete and current view of resources available on the network, without the need for complex addressing schemes, and allows users to find resources by using natural and logical names that are consistent with the workplace. Users do not need to know where a resource is located; they only need to know a resource name.

The GNS maintains names in a certain defined format for internal use; in the exemplary StreetTalk naming service, the format is: Item@Group@Org, with the item having up to 31 characters, and the group and organization each having up to 15 characters. For users in a large organization with a various departments and locations, the item could be the individual's name, the group could be the department, and the organization could be the city or country of the user. Servers can be identified, for example, with the item being the type of server, such as Printer 1, the group being the department, and the organization identified as "Servers."

The names can be provided on permanent distribution lists that are maintained by the servers and accessible to a number of users. With all the names on the distribution lists having a particular defined format, when a user wants to send messages to a distribution list with all recipients in the network, a messaging service causes the messages to be routed in a generally known manner. With increasingly different types of communications, however, names in such distribution lists with a defined format may be inadequate. For example, the defined format may be inconsistent with other types of addresses such as remote e-mail, which is typically of the form name@org.ext. It may also be desirable to send messages to recipients through other media, such as facsimile communication or telephone communication, but the defined format may also be insufficient for such communications.

Currently, individual users can create entries of users that include internal routing to services with information for routing outside the network by the services. Such entries are temporary, however, in that they are created only for sending the message, and cannot be kept on permanent distribution lists. Moreover, the ability to create these temporary entries requires users to have extensive knowledge of services and formats.

OBJECTS AND SUMMARY OF THE INVENTION

It is an object of the present invention to provide flexibility in maintaining and using mailing lists in a network system for communicating with users and resources both inside and outside the network.

According to the present invention, the network has a server with a naming service that stores distribution lists of names with a defined format portion for routing messages to recipients within the network, along with additional routing information to allow routing from the network to recipients outside the network. This additional routing information is not in the defined format, but can take one of a number of forms, such as a remote e-mail address, or a telephone number for facsimile transmission or for a pager. The messaging service routes the message and the routing information to another server or service, which routes the message to the recipients outside the network.

The present invention also includes a method for routing messages to recipients named on a distribution list. According to this method, a network maintains distribution lists of names for recipients of messages, such that at least one of the names on one of the lists represents a recipient outside the network. Each name has at least a defined format portion for communicating within the network. For the name of the recipient who is outside the network, the name further includes additional routing information not in the defined format. When a user requests that a messaging service send a message to all names on the list, the message is routed within the network according to the defined format portion of the name. The messaging service passes any routing information to another server as indicated by the defined format portion for routing the message to the recipient outside the network according to the routing information.

By allowing routing information to be kept on permanent distribution lists along with defined format portions for internal use, a user can communicate with remote recipients through a number of different means, including facsimile, paging, or remote e-mail. This network system is also flexible to accommodate other and future forms of communication. Members can be easily added to or modified on such lists, and all the information is conveniently and succinctly displayed to the user. Other objects, features, and advantages will become apparent from the following detailed description, drawings and claims.

DETAILED DESCRIPTION

Figure 1:
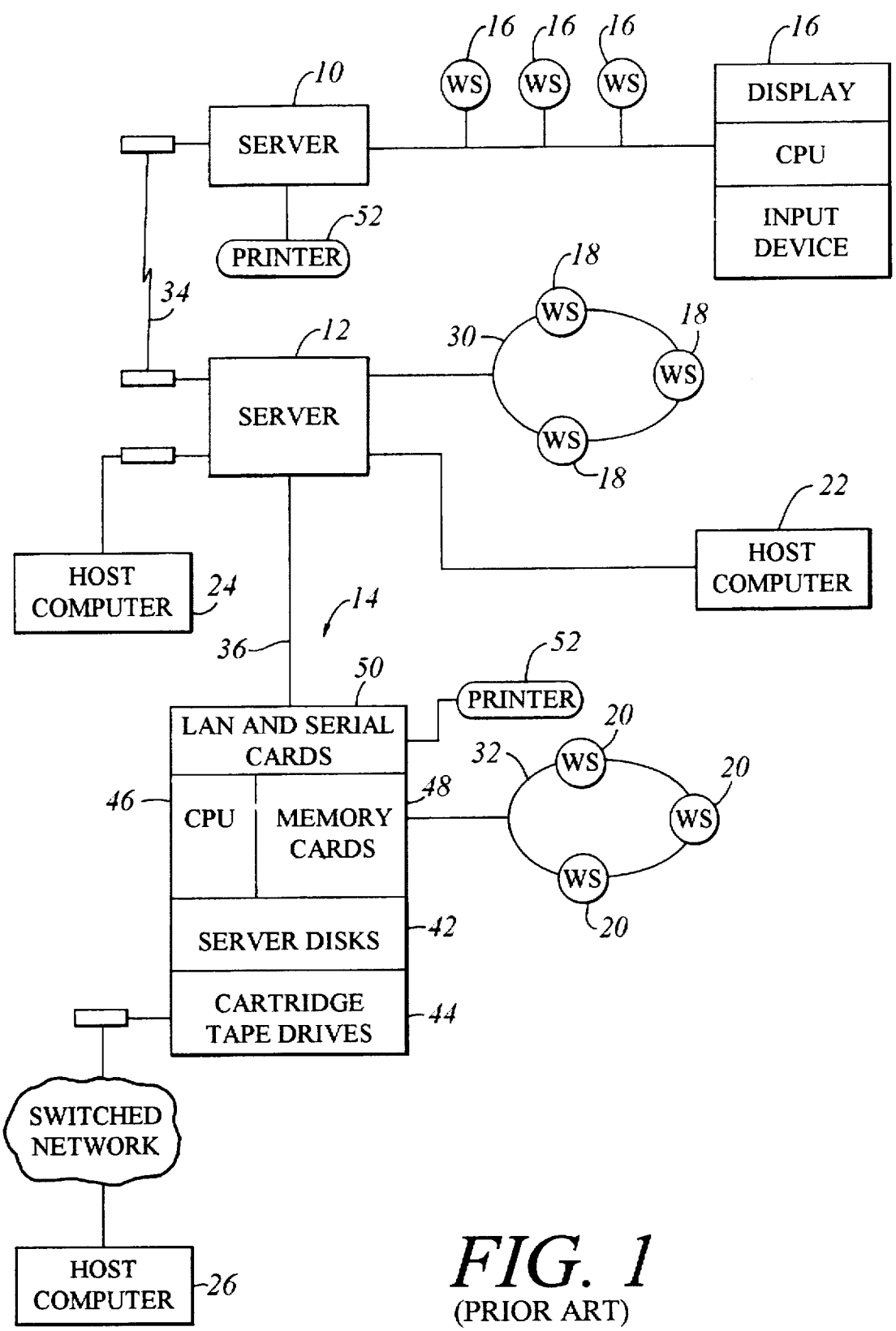
FIG. 1 is a block diagram of an exemplary network made up of known network topologies.
Figure 2:
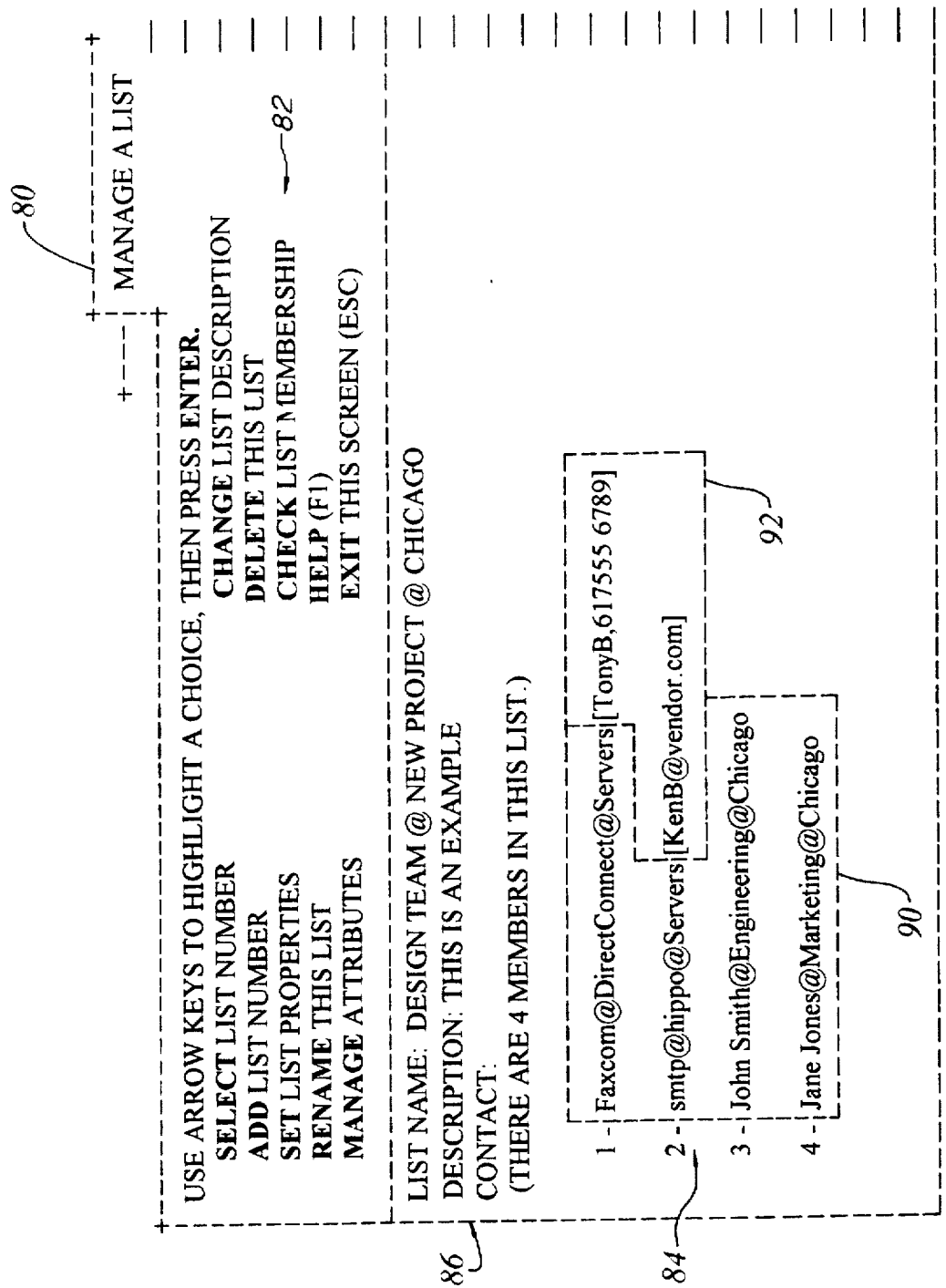
FIG. 2 is a representation of a screen display for managing a list of names according to the present invention.

FIG. 2 is a representation of a screen display used by network administrators to manage a distribution list. As used here, a distribution list is different from any generic group of names in that a distribution list is permanent (unlike a temporary mailing list created for a particular message), is stored and maintained as a single object by a server or host computer, and is accessible to a number of users (unlike a private mailing list).

The administrator, working typically with a workstation having at least an input device and a display device, enters MLIST on an initial command line and receives a "Manage Lists" menu on the display device. By selecting a particular list, the workstation displays a "Manage A List" menu screen 80 that has a menu 82 of commands for managing names on a distribution list 84. Between menu 82 and list 84 is an informational section 86 about the list, including the name, description, contact, and number of members in the list. Menu 80 is similar to a menu in a prior known version of this naming service, except for the "SET list properties" command which is discussed in more detail below.

Previously, all of the names on a distribution list consisted solely of a defined format portion 90 that allowed a messaging service to send messages internally to other users in the network; in the exemplary system, the defined format of each name is in the form of item@group@org. In distribution list 84, member nos. 3 and 4 are solely in this format; but the names for member nos. 1 and 2 have additional routing information 92 in brackets immediately following the respective defined format portions while permanent, individual entries can be modified and deleted, and new entries can be added. Thus, the defined format portion and additional routing information are displayed together on the distribution list in a manner that is succinct and convenient.

Previously, when a name was added to a distribution list, the name was checked closely for proper format, i.e., for the @ characters and the appropriate number of characters. With the present invention, checking process is relaxed to allow for the additional routing information.

Figure 3:
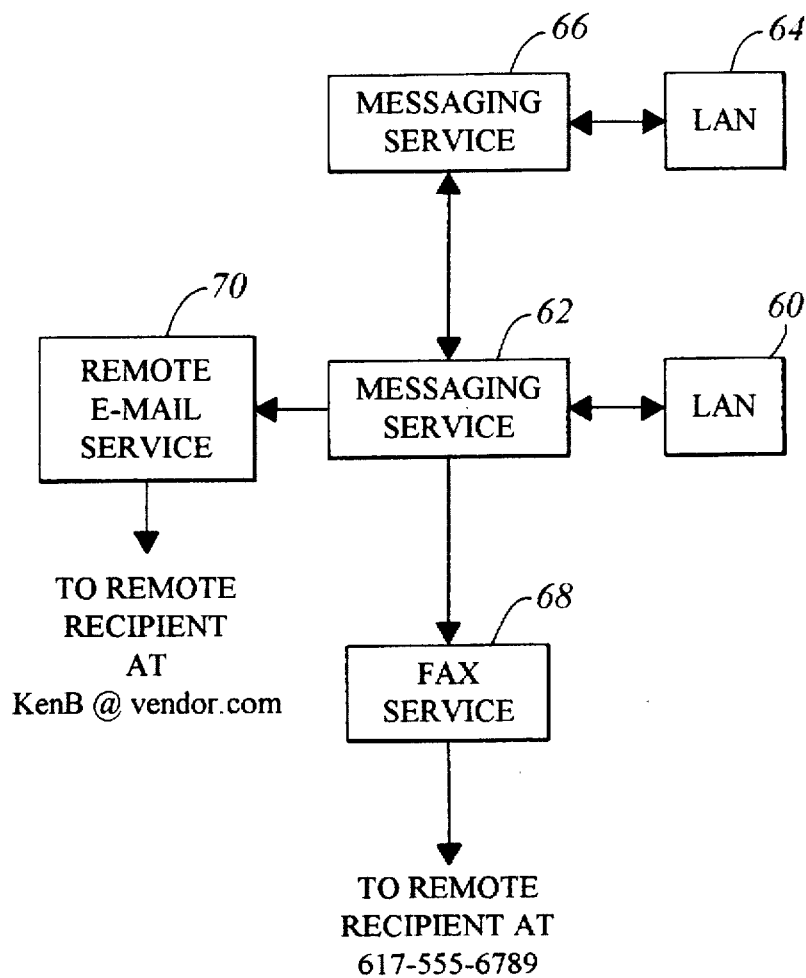
FIG. 3 is a block diagram of services in one or more servers.

Referring also to FIG. 3, when a user connected to a first LAN 60 sends a message to names on a distribution list such as the list shown in FIG. 2, the message and the distribution list are sent to a messaging service 62, which routes the message according to the defined format portions 90 of the names. Names listed only with this defined format typically refer to users, in which case the messages are sent to users through LAN 60 or to users connected to another LAN 64 via another messaging service 66. These users, LANs, and services are operatively interconnected, either with one or a combination of hard-wired connections, switched networks, or by wireless communications.

Names with additional routing information portions 92 are typically provided to a server indicated by the defined format portion, with the routing information being sent essentially without change and without the need for verification.

To send to member no. 1, who receives the message by facsimile transmission through a fax service 68, the defined format portion, Faxcom@DirectConnect@Servers, causes the message to be routed to fax service 68; in this case, the bracketed routing information includes a phone number. Fax service 68 uses this phone number to send the message to a remote user (TonyB) by facsimile. Using a telephone number, the message could alternatively be sent with a pager (or a message could be sent to the recipient suggesting that the user call in or log to receive the routed message), in which case the routing information could also include a pin number.

To send the message by remote e-mail to member no. 2, the defined format portion causes the message to be sent to an appropriate e-mail service 70, indicated as smtp@hippo@Servers. The indicated service receives the message and the routing information, with the routing information in the form of an e-mail address. The service then routes the message by remote e-mail.

Note that in the exemplary embodiment, with respect to remote e-mail, the defined format portion cannot be used for sending messages by remote e-mail, while the e-mail address (the routing information) cannot be used for internal network routing. Nonetheless, the names with these two types of formats are provided together conveniently for display to users on workstations and for use on permanent distribution lists.

The present invention also includes a method for sending a message to names on a distribution list. According to this method, a messaging service receives a single command indicating that a message should be sent to an existing distribution list. The messaging service may optionally check the defined format portion of each name. For portions of the name that are in brackets, the messaging service does not check the information enclosed by the brackets. When the entries are verified, the messaging service causes the message to be sent to each of the names on the list. If a name does not have additional routing information, the message will be sent to a recipient according to the name in the defined format portion in a generally known manner. If the name has additional routing information, however, the message and this information are passed on for further routing to another service or server indicated by the defined format portion. When the server or service receives this message and identifying information, it may verify that the information is of the correct general type; for example, the fax service may verify that the number has a certain minimum number of digits, or for a remote e-mail address, the appropriate service can make sure the format of the e-mail address is correct.

With this network and method for routing remote communications, it is convenient for administrators to manage lists and for users to view lists. Referring again to FIG. 2, from the Manage A List menu screen, an administrator can select "ADD list member." To add a member in the network with a name only in the defined format, the information is entered as was done previously. For a member who will receive messages remotely, the administrator similarly enters the name of an appropriate server in the defined format and bracketed information for the external routing. Accordingly, it is just as easy to add new members to lists.

A distribution list may be associated with a list properties attribute that forbids entries with any such additional routing information, or particular types of routing information. In this case, the attempted addition of such a name on the list will be denied. It may be desirable, for example, to deny list membership with remote routing information in distribution lists with which particularly sensitive information is routed.

This denial of such entries is one of a number of list properties that are kept in an attribute associated with the list. Referring again to FIG. 2, to learn whether such names can be added to a list or to change this indication, the user, who typically must be an administrator, selects the SET list properties command. While the default preferably allows additional routing information, such as remote e-mail addresses, to be added to lists, by providing a certain value to this list properties attribute, such names can be forbidden.

From the Manage A List menu, an administrator can select SET list properties to provide values into the list properties attribute to indicate other list properties, including access protection. More specifically, this attribute can have other numerical values that indicate whether non-administrator users can modify the distribution list.

With a first type of access protection referred to as "public," the list can be self-modified, i.e., a non-administrator user can add, delete, or change information about himself or herself. Public access protection does not allow the user to modify any information relating to any other user.

A second new type of access protection, referred to as "open," allows a non-administrator user to add, delete, or change any user on the list, including himself or herself. Furthermore, the system can maintain a record of changes that have been made to open lists to determine if anyone uses the list for an improper purpose.

Other types of access protection could also be added to the list properties attribute to allow certain types of modifications, but not others; for example, the open access protection can be changed, or a new protection created, so that non-administrators can add other members, but cannot delete them; or access can be limited to allow a non-administrator user to add certain groups of people but not others, such as people in one's own group.

When an administrator selects SET list properties from the Manage A List menu, two columns are displayed, one with a list of the properties, and another with a YES or NO indication that can be changed easily. Thus, it is easy for an administrator to view and modify the access protection.

Previously, only network administrators who were listed on a relevant administrator list were allowed to make additions, deletions, and changes to distribution lists. Providing a list properties attribute with such access rights allows non-administrator users to conveniently modify lists without the need of a network administrator; this ability also frees up the network administrator to perform other tasks.

Other list properties that can be associated with a list preferably include whether a list can be a member of the list, whether a user can be a member of the list, whether a service can be a member of the list, and whether a template can be a member of the list. Accordingly, the present invention provides the ability to create, modify, and use lists with which messages are sent inside the network and outside the network. For messages outside the network, the messages can be sent through a number of different types of communications. Furthermore, the system should be sufficiently flexible not only for a variety of current communications, but should also accommodate new forms of communications that may developed in the future. The capability of supporting remote e-mail and other types of external routing information can be added to an existing system that has a particular defined format by adding the ability to recognize the routing information in brackets and to pass the information to a service. Such a change should not adversely affect lists currently kept solely in the defined format.

Having described preferred embodiments of the present invention, it should be apparent that other modifications can be made without departing from the scope of the appended claims. While the messaging service, fax service, and remote e-mail service are shown separately, they can be combined or partly combined into one server or distributed among different servers. Certain functions, such as maintaining a database of names and attributes, can be performed by a host computer.

What is claimed is:

1. A method for use with a network having a first service for routing messages among users and services in the network and a second service for routing messages to recipients outside the network, the method comprising the network-implemented steps of:

(a) maintaining a permanent, accessible distribution list with names for receiving messages with at least a first name on the list corresponding to a first recipient in the network and a second name on the list corresponding to a second recipient outside the network, the first name including a defined format portion for indicating the first recipient, the second name including a defined format portion that identifies the second service as the recipient and further including a routing information portion for routing the message to the second recipient outside the network in a format different from the defined format, the defined format and the different format being characterized such that the message cannot be routed within the network solely with the routing information portion in the different format and the message cannot be routed outside the network solely with the defined format portion;

(b) in response to a single request by a user to send a message to all names on the list, the first service receiving the message and the list, causing the message to be routed to the first recipient in the network according to the defined format portion of the first name, and causing the message for the second recipient outside the network to be routed to the second service, the message being routed to the second service along with the routing information in the different format; and (c) the second service receiving the message and the routing information in the different format and using the routing information to route the message to the second recipient outside the network.

2. The method of claim 1, the routing information including a remote e-mail address, and step (c) including routing the message to the second recipient with the remote e-mail address.

3. The method of claim 1, the routing information including a telephone number, step (c) including routing the message to the second recipient by facsimile with the telephone number.

4. The method of claim 1, the routing information including a telephone number, step (c) including routing the message to the second recipient by a paging service with the telephone number.

5. The method of claim 1, further including a step of causing the list of names to be displayed on a display device with both the defined format portion together with any additional routing information.

6. The method of claim 5, wherein the second name is listed substantially only with its defined format portion, its routing information portion, and information for separating the portions.

7. The method of claim 1, further including a step of adding a name to the list, the adding step consisting essentially of receiving a user input with a service name and with additional routing information.

8. A network comprising:
  a number of workstations;
  a first service, operatively coupled to the workstations, for supporting communications with recipients in the network;
  a second service, operatively coupled to the first service, for routing messages to recipients outside the network; and
  a naming service, operatively coupled to the workstations, including storage for maintaining distribution lists of names indicating recipients to which messages can be sent by the users, at least a first name on one of the distribution lists having a portion in a defined format for routing communications within the network by the first service, and a second name on one of the distribution lists having a portion in a defined format indicating the second service as a recipient and further having routing information in a format different from the defined format for indicating a recipient;
  wherein, in response to a request by one of the users to send a message to all names on the distribution list, the first service for routing to a recipient according to the first name, and to the recipient according to the second name by routing the message to the second service according to the defined format portion of the name, and passing the routing information to the second service for routing the message to the recipient outside the network.

9. The network of claim 8, further including a display device, the naming service causing the distribution lists of names to be displayed, each distribution list names being displayed so that each name is listed with substantially only either the defined format portion or the defined format portion and the routing information.

10. The network of claim 8, wherein the naming service further includes information associated with at least some of the distribution lists indicating whether further routing information can be associated with the defined format portion.

11. The network of claim 8 wherein the second server is a remote e-mail server, and the routing information includes a remote e-mail address.

12. The network of claim 8 wherein the second server is a fax server, and the routing information includes a telephone number.

13. A network comprising:
  a number of workstations;
  a messaging service, operatively coupled to the workstations, for supporting communications within the network; and
  a naming service operatively coupled to the workstations, and including storage for maintaining a plurality of different permanent distribution lists with names indicating recipients to which messages can be sent by the users, at least a first name on one of the distribution lists having a portion in a defined format for the messaging service to route communications within the network, and a second name on one of the distribution lists having a portion in the defined format, the defined format portion indicating a destination within the network, and further having routing information in a format different from the defined format for indicating a recipient outside the network.

14. The network of claim 13, wherein the routing information includes a remote e-mail address.

15. The network of claim 13, wherein the routing information includes a telephone number.

16. The network of claim 13, wherein the workstations have displays, the naming service for maintaining the lists so that names with only a defined format portion can be displayed with names that also have routing information in a different format.

17. A method for use with a network having a first service for routing messages among users and services in the network and a second service for routing messages to recipients outside the network, the method comprising the network-implemented steps of:
  maintaining a plurality of permanent, accessible distribution lists with names by which users can send messages to different groups of recipients, at least one of the lists having a first name corresponding to a first recipient within the network and a second name corresponding to a second recipient outside the network, the first name including a first internal mail format portion for indicating the first recipient, the second name including a second internal mail format portion that identifies the second service as the recipient and further including routing information for the second service to route the message to the second recipient, the routing information being in a format different from the internal mail format, the internal mail format and the routing information being characterized such that the message cannot be routed within the network solely with the routing information and the message cannot be routed outside the network solely with the internal mail format portion;
  in response to a single request by a user to send a message to all names on the list, the first service receiving the message and the list, causing the message to be routed to the first recipient in the network according to the internal mail format portion of the first name, and causing the message for the second recipient to be routed to the second service along with the routing information in the different format; and
  the second service receiving the message and the routing information in the different format and using the routing information to route the message to the second recipient outside the network.

18. The method of claim 17, wherein the step of causing the message for the second recipient to be routed includes routing the message to the second recipient with one of a remote e-mail address, facsimile transmission, and a page.

19. A network comprising:

a number of workstations;

a first service, operatively coupled to the workstations, for supporting communications with recipients within the network;

a second service, operatively coupled to the first service, for routing messages to recipients outside the network; and a naming service, operatively coupled to the workstations, including storage for maintaining a plurality of different distribution lists with names indicating recipients to which messages can be sent by the users, a first name on one of the distribution lists having a portion in a defined internal mail format for routing communications within the network by the first service, and a second name on the one of the distribution lists having a portion in a defined internal mail format indicating the second service as a recipient and further having routing information in a format different from the defined internal mail format for indicating a recipient, wherein, in response to a request by one of the users to send a message to all names on the one distribution list, the first service for routing to a recipient according to the first name, and to the recipient according to the second name by routing the message to the second service according to the defined format portion of the name, and then providing the routing information to the second service for routing the message to the recipient outside the network, the routing information for indicating a recipient to receive the message according to a method different from through internal mail.

20. The network of claim 19, wherein the second server is one of a remote e-mail server, a fax server, and a pager.

\* \* \* \* \*